(12) United States Patent
Rimmington

(10) Patent No.: US 10,125,606 B2
(45) Date of Patent: Nov. 13, 2018

(54) SYSTEMS AND METHODS FOR FLUID DELIVERY IN A LONGWALL MINING SYSTEM

(71) Applicant: Joy MM Delaware, Inc., Wilmington, DE (US)

(72) Inventor: Gareth Rimmington, South Yorks (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 116 days.

(21) Appl. No.: 15/150,120

(22) Filed: May 9, 2016

(65) Prior Publication Data
US 2017/0321550 A1 Nov. 9, 2017

(51) Int. Cl.
*E21C 27/02* (2006.01)
*E21B 21/00* (2006.01)
(Continued)

(52) U.S. Cl.
CPC ............... *E21C 27/02* (2013.01); *E21C 7/08* (2013.01); *E21C 25/06* (2013.01); *E21C 31/02* (2013.01);
(Continued)

(58) Field of Classification Search
CPC .......... E21C 35/22; E21C 25/06; E21C 27/02; E21C 35/23; E21C 35/24; E21C 7/08;
(Continued)

(56) References Cited

U.S. PATENT DOCUMENTS 3,747,928 A * 7/1973 Spransy ................ A63B 67/22
273/329
3,980,338 A 9/1976 Weber
(Continued)

FOREIGN PATENT DOCUMENTS

CN 103643954 3/2014
DE 4343493 C2 9/1996
(Continued)

OTHER PUBLICATIONS

Polish Search Report for Application No. PA21504 dated Oct. 6, 2017 (3 pages including Statement of Relevance).
(Continued)

*Primary Examiner* — Carib A Oquendo
(74) *Attorney, Agent, or Firm* — Michael Best & Friedrich LLP

(57) ABSTRACT

A fluid delivery system for a longwall shearer. The fluid delivery system includes a flow control device and an electronic processor. The flow control device is in fluid communication with a nozzle positioned on the shearer, and in fluid communication with a fluid source. The electronic processor is coupled to the flow control device. The electronic processor is configured to receive a measure of a capacity parameter, and determine a model fluid flow based on the measure of the capacity parameter. The capacity parameter corresponds to a position of the shearer along the mineral face. The electronic processor is further configured to set an operational parameter of the flow control device based on the model fluid flow, and operate the flow control device at the set operational parameter.

19 Claims, 14 Drawing Sheets

(51) Int. Cl.
*E21C 25/06* (2006.01)
*G05B 17/02* (2006.01)
*G05D 7/06* (2006.01)
*E21C 31/02* (2006.01)
*E21C 35/24* (2006.01)
*F15B 15/28* (2006.01)

(52) U.S. Cl.
CPC .......... *E21C 35/24* (2013.01); *F15B 15/2838* (2013.01); *G05B 17/02* (2013.01); *G05D 7/0635* (2013.01); *G05D 7/0676* (2013.01)

(58) Field of Classification Search
CPC ........ B05B 9/06; G05B 17/02; G05D 7/0635; G05D 7/0676
USPC ...... 299/1.6, 16, 17, 30, 34.05, 42, 43, 81.1, 299/81.2, 81.3
See application file for complete search history.

(56) References Cited

U.S. PATENT DOCUMENTS

| | | | |
|---|---|---|---|
| 4,691,967 A | 9/1987 | Schupphaus | |
| 4,753,484 A * | 6/1988 | Stolarczyk | E21C 35/24 299/1.1 |
| 4,921,306 A * | 5/1990 | Tomlin | E21C 35/23 239/101 |
| 4,976,495 A * | 12/1990 | Lewins | E21C 35/24 299/1.1 |
| 5,518,299 A * | 5/1996 | Adamczyk | E21C 35/223 299/12 |
| 7,954,904 B2 | 6/2011 | Mundry et al. | |
| 8,690,260 B1 * | 4/2014 | Stolarczyk | E21C 27/02 299/1.1 |
| 9,046,895 B2 * | 6/2015 | Orr | A01B 79/005 |
| 2012/0018544 A1 * | 1/2012 | Chugh | E21C 27/24 239/589 |
| 2014/0263720 A1 | 9/2014 | Travaglini | |
| 2014/0265528 A1 * | 9/2014 | O'Neill | E21C 1/00 299/42 |

FOREIGN PATENT DOCUMENTS

| | | |
|---|---|---|
| GB | 1473267 A | 5/1977 |
| PL | 224886 | 9/2014 |
| PL | 222502 | 8/2016 |

OTHER PUBLICATIONS

United Kingdom Search Report for Application No. GB1706730.7 dated Oct. 26, 2017 (3 pages).

* cited by examiner

SYSTEMS AND METHODS FOR FLUID DELIVERY IN A LONGWALL MINING SYSTEM

BACKGROUND

The present invention relates to fluid delivery in a longwall mining system.

SUMMARY

In one embodiment, the invention provides a longwall shearer system including a shearer, an electronic controller, and a fluid distribution system. The shearer is configured to travel along a mineral face. The shearer includes a shearer body, a cutter drum coupled to the shearer body, and a nozzle positioned on the cutter drum. The electronic controller is configured to measure a capacity parameter of a longwall shearer operation. The capacity parameter corresponds to a position of the shearer along the mineral face. The fluid delivery system includes a flow control device and an electronic processor. The flow control device is in fluid communication with the nozzle and with a fluid source. The electronic processor coupled to the flow control device. The electronic processor is configured to receive the measure of the capacity parameter, determine a model fluid flow based on the measure of the capacity parameter, set an operational parameter of the flow control device based on the model fluid flow, and operate the flow control device at the set operational parameter.

In another embodiment, the invention provides a method of controlling a fluid delivery system for a longwall shearer system. The method includes determining, a measure of a capacity parameter, and determining, with an electronic processor, a model fluid flow based on the measure of the capacity parameter. The capacity parameter corresponds to a position of the shearer along the mineral face. The method also includes setting, with the electronic processor, a parameter of a flow control device to deliver the model fluid flow via a nozzle positioned on a cutter drum of the shearer, and operating, via the electronic processor, the flow control device at the set parameter to spray fluid, via the nozzle. The flow control device being in fluid communication with the nozzle and with a fluid source.

In another embodiment the invention also provides a fluid distribution system for a longwall shearer. The fluid distribution system includes a flow control device and an electronic processor. The flow control device is in fluid communication with a nozzle positioned on the shearer, and in fluid communication with a fluid source. The electronic processor is coupled to the flow control device. The electronic processor is configured to receive a measure of a capacity parameter, and determine a model fluid flow based on the measure of the capacity parameter. The electronic processor is also configured to set an operational parameter of the flow control device based on the model fluid flow, and operate the flow control device at the changed parameter. The capacity parameter corresponds to a position of the shearer along the mineral face.

Other aspects of the invention will become apparent by consideration of the detailed description and accompanying drawings.

DETAILED DESCRIPTION

Figure 1:
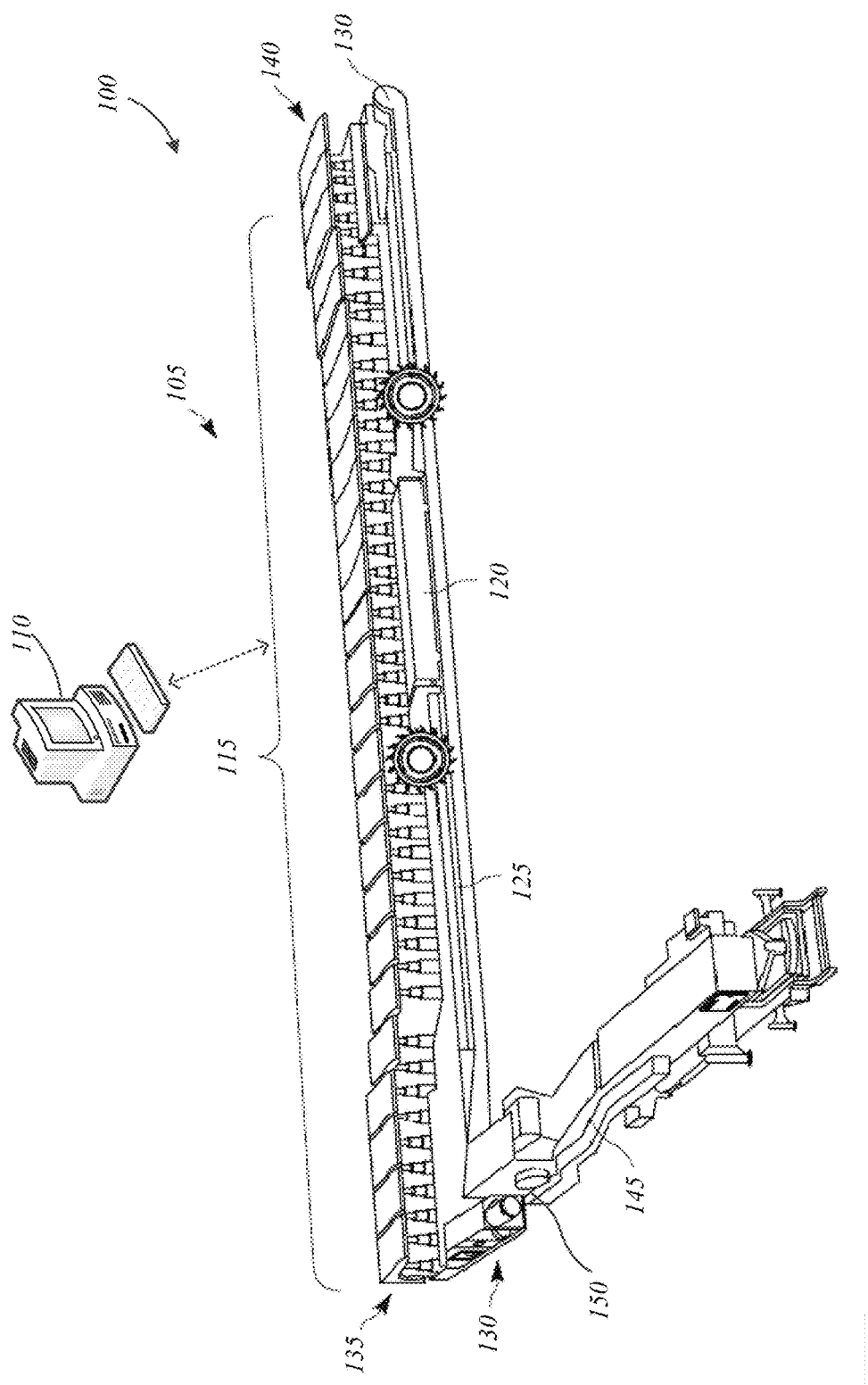
FIG. 1 illustrates a longwall mining system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it would be noted that a plurality of hardware and software based devices, as well as a plurality of different structural components, may be utilized to implement the invention. Furthermore, and as described in subsequent paragraphs, the specific mechanical configurations illustrated in the drawings are intended to exemplify embodiments of the invention. However, other alternative mechanical configurations are possible. For example, "controllers" and "modules" described in the specification can include standard processing components, such as one or more processors, one or more computer-readable medium modules, one or more input/output interfaces, and various connections (e.g., a system bus) connecting the components. In some instances, the controllers and modules may be implemented as one or more of general purpose processors, digital signal processors (DSPs), application specific integrated circuits (ASICs), and field programmable gate arrays (FPGAs) that execute instructions or otherwise implement their functions described herein.

FIG. 1 illustrates a longwall mining system 100. The longwall mining system 100 includes a longwall shearer system 105 and a monitoring system 110. The longwall mining system 100 is configured to extract a product or mineral, for example, coal, from a mine in an efficient manner. The longwall shearer system 105 physically extracts mining material (e.g., coal) from an underground mine and communicates with the monitoring system 110 regarding the operation of the longwall shearer system 105.

As shown in FIG. 1, the longwall shearer system 105 includes roof supports 115 and a longwall shearer 120. The roof supports 115 are interconnected parallel to the mineral face (not shown) by electrical and hydraulic connections. Further, the roof supports 115 shield the shearer 120 from overlying geological strata. The number of roof supports 115 used in the longwall shearer system 105 depends on the width of the mineral face being mined since the roof supports 115 are generally intended to protect the full width of the mineral face from the strata. The shearer 120 is propagated along the mineral face by an armored face conveyor (AFC) 125, which has a dedicated rack bar for the shearer 120 running parallel to the mineral face between the face itself and the roof supports 115. The AFC 125 also includes a conveyor parallel to the shearer rack bar, such that excavated mining material (e.g., coal) can fall onto the conveyor to be transported away from the mineral face. The conveyor and rack bar of the AFC 125 are driven by AFC drives 130 located at a maingate 135 and a tailgate 140. The maingate 135 and the tailgate 140 refer to the distal ends of the AFC 125. The AFC drives 130 allow the conveyor 125 to continuously transport mining material toward the maingate 135 (left side of FIG. 1), and allows the shearer 120 to be hauled along the rack bar of the AFC 125 bi-directionally across the mineral face. Depending on the specific mine layout, the layout of the longwall shearer system 105 can be different than described above, for example, the maingate 135 may be on the right distal end of the AFC 125 and the tailgate 140 may be on the left distal end of the AFC 125.

The longwall shearer system 105 also includes a beam stage loader (BSL) 145 arranged perpendicularly at the maingate 135 end of the AFC 125. When the won mining material hauled by the AFC 125 reaches the maingate 135, the mining material is routed through a 90° turn onto the BSL 145. In some embodiments, the BSL 145 interfaces with the AFC 125 at an oblique angle (e.g., a non-right angle). The BSL 145 then prepares and loads the mining material onto a maingate conveyor (not shown), which transports the mining material to the surface. The mining material is prepared to be loaded by a crusher (or sizer) 150, which breaks down the mining material to improve loading onto the maingate conveyor. Similar to the conveyor of the AFC 125, the conveyor of the BSL 145 is driven by a BSL drive (not shown).

The monitoring system 110 exchanges information with the longwall shearer system 105 regarding, for example, physical dimensions of the mine, speed of operation of the longwall shearer system 105, operation of a fluid distribution system 210 (FIG. 2) of the longwall shearer system 105, and other operational functions of the longwall shearer system 105. In some embodiments, the monitoring system 110 sends control signals to the longwall shearer system 105 to change an operation of the longwall shearer system 105. The monitoring system 110 is described in more detail with respect to FIG. 6.

Figure 2:
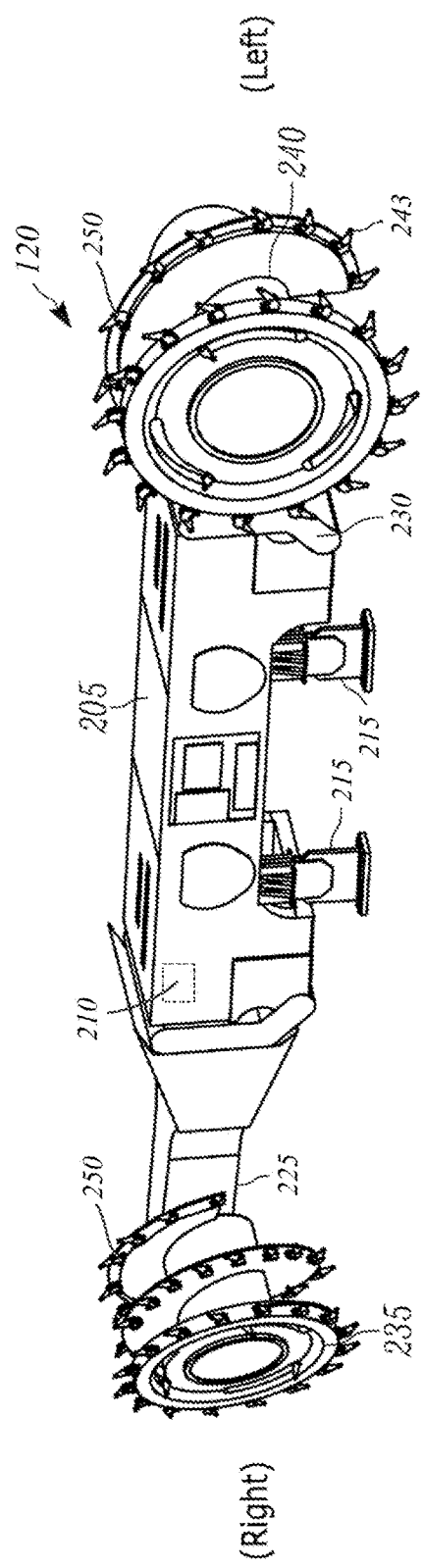
FIG. 2 is a side perspective view of a longwall shearer of the longwall mining system of FIG. 1.
Figure 3:
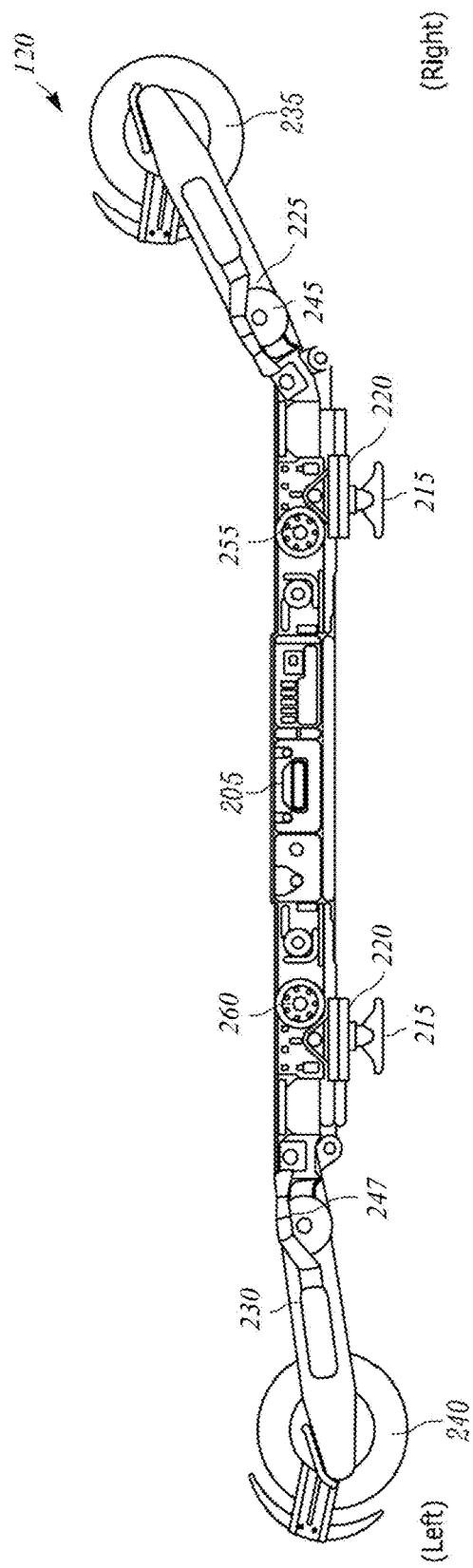
FIG. 3 is an exposed profile view of the longwall shearer of FIG. 2.
Figure 4:
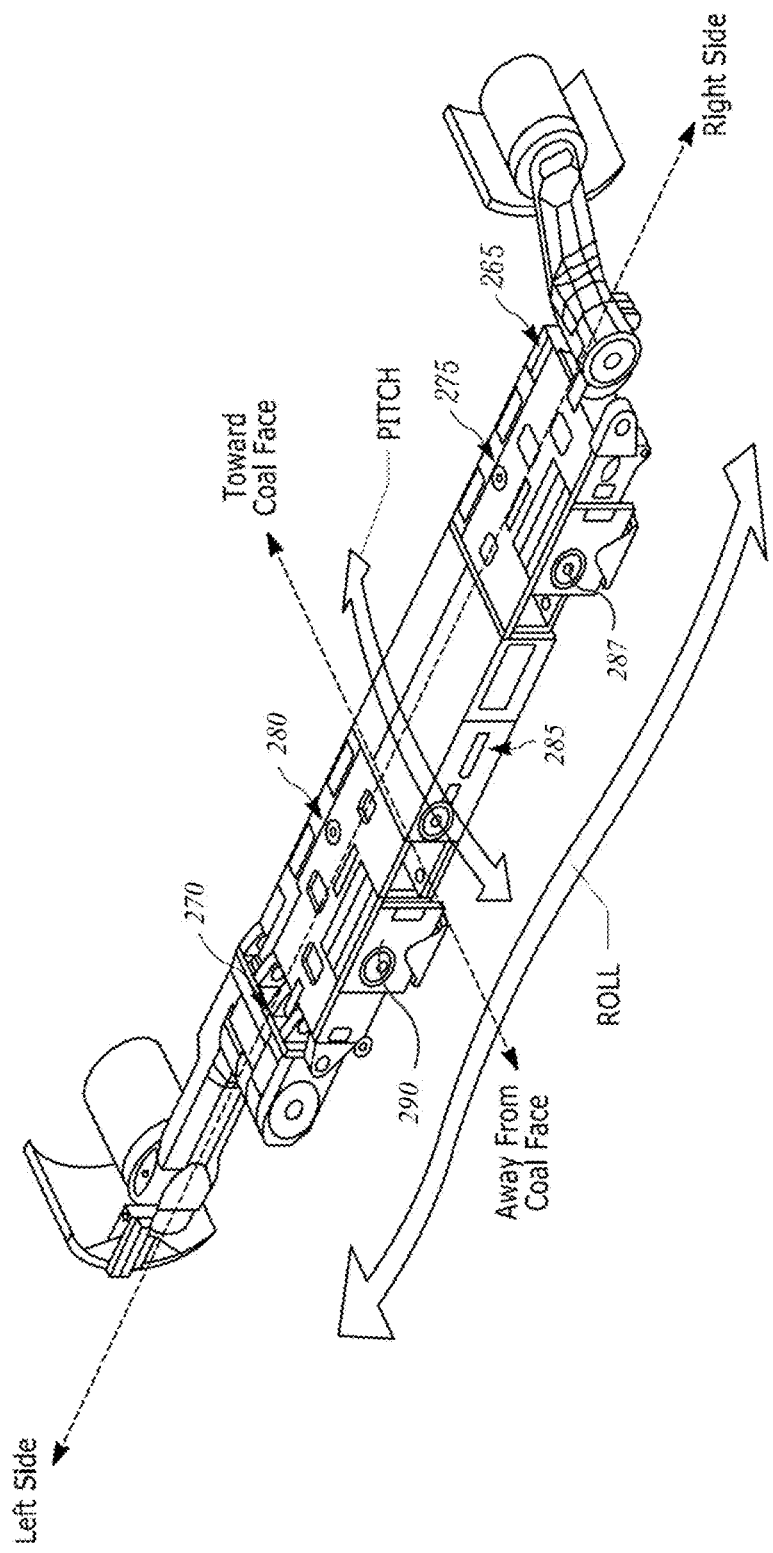
FIG. 4 is a top perspective view of the longwall shearer of FIG. 2.

FIGS. 2-4 illustrate the shearer 120. FIG. 2 illustrates a side perspective view of the shearer 120. The shearer 120 includes an elongated central housing 205 that supports and protects the operating controls for the shearer 120. In the illustrated embodiment, the central housing 205 also includes controls for a fluid distribution system 210. Extending below the central housing 205 are skid shoes 215 and trapping shoes 220 (FIG. 3). The skid shoes 215 support the shearer 120 on the mineral face of the AFC 125 (e.g., the side nearest to the mineral face) and the trapping shoes 220 support the shearer 120 on the goaf side of the AFC 125. In particular, the trapping shoes 220 and haulage sprockets engage the rack bar of the AFC 125 allowing the shearer 120 to be propelled along the AFC 125 and mineral face. As also shown in FIG. 2, a right ranging arm 225 and a left ranging arm 230 extend from the central housing 205. The right ranging arm 225 and the left ranging arm 230 are raised and lowered by a right arm hydraulic subsystem 233 and a left arm hydraulic subsystem 234 (FIG. 6), respectively. The hydraulic subsystems 233, 234 (FIG. 6) include hydraulic cylinders attached to the under-side of the right ranging arm 225 and the left ranging arm 230 to raise and/or lower the ranging arms 225, 230.

As shown in FIGS. 2-4, on its distal end, the right ranging arm 225 supports a right cutter drum 235. Analogously, the left ranging arm 230 supports a left cutter drum 240 on its distal end. Each cutter drum 235, 240 is driven by an electric motor 245, 247 (shown in FIG. 3), respectively. The electric motors 245, 247 drive the right cutter drum 235 and the left cutter drum 240 via gear trains within the ranging arms 225, 230. Each of the cutter drums 235, 240 includes a plurality of mining bits 243 (e.g., cutting picks) that abrade the mineral face as the cutter drums 235, 240 are rotated, thereby cutting away the mining material. Each of the cutter drums 235, 240 also include a plurality of spray nozzles 250. Each of the spray nozzles 250 corresponds to one of the mining bits 243 and are therefore positioned circumferentially around the cutter drums 235, 240 adjacent to the mining bits 243. The spray nozzles 250 spray fluid (e.g., water) during the mining process to disperse one or more noxious and/or combustible gases that develop at the excavation site, suppress dust, and enhance cooling. The spray nozzles 250 are in fluid communication with the fluid distribution system 210, which controls the amount of fluid sprayed during the operation of the shearer 120. FIG. 3 illustrates an exposed profile view of the shearer 120 including the right haulage motor 255 and the left haulage motor 260 that drive the shearer 120 along the AFC 125.

FIG. 4 is a top perspective view of the shearer 120. As shown in FIG. 4, the shearer 120 also includes various sensors to enable automatic control of the shearer 120 during a mining operation. For example, the shearer 120 includes a right arm inclinometer 265, a left arm inclinometer 270, right haulage gear sensors 275, and left haulage gear sensors 280. In the illustrated embodiment, the shearer 120 also includes a pitch angle and roll angle sensor 285. FIG. 4 shows the approximate locations of the various sensors. In other implementations, the sensors may be positioned elsewhere in the shearer 120. The inclinometers 265, 270 provide information regarding an angle or slope of the ranging arms 225, 230. In some embodiments, the shearer 120 includes, in addition to or instead of the inclinometers 265, 270, linear transducers mounted between each ranging arm 225, 230 and the central housing 205 to provide information regarding the position of the ranging arms 225, 230. The haulage gear sensors 275, 280 provide information regarding the position of the shearer 120 along the AFC 125 as well as speed and direction of movement of the shearer 120. In the illustrated embodiment, the shearer 120 also includes a right tachometer 287 associated with the right haulage motor 255 and a left tachometer 290 associated with the left haulage motor 260. The output signals from the right tachometer 287 and the left tachometer 290 may be used to estimate of the speed of the shearer 120 along the AFC 125. In other embodiments, the right tachometer 287 and the left tachometer 290 replace the haulage gear sensors 275, 280. The right tachometer 287, left tachometer 290, right and left haulage gear sensor 275, 280, in some embodiments, sense speed and position of the shearer 120 by detecting position and/or rotation of the right haulage motor 255 and the left haulage motor 260.

The pitch and roll angle sensor 285 provides information regarding the angular alignment of the central housing 205. As shown in FIG. 4, the pitch of the shearer 120 refers to an angular tilting toward and away from the mineral face, while the roll of the shearer 120 refers to an angular difference between the right side of the shearer 120 and the left side of the shearer 120, as more clearly shown by the axes in FIG. 4.

Figure 5A:
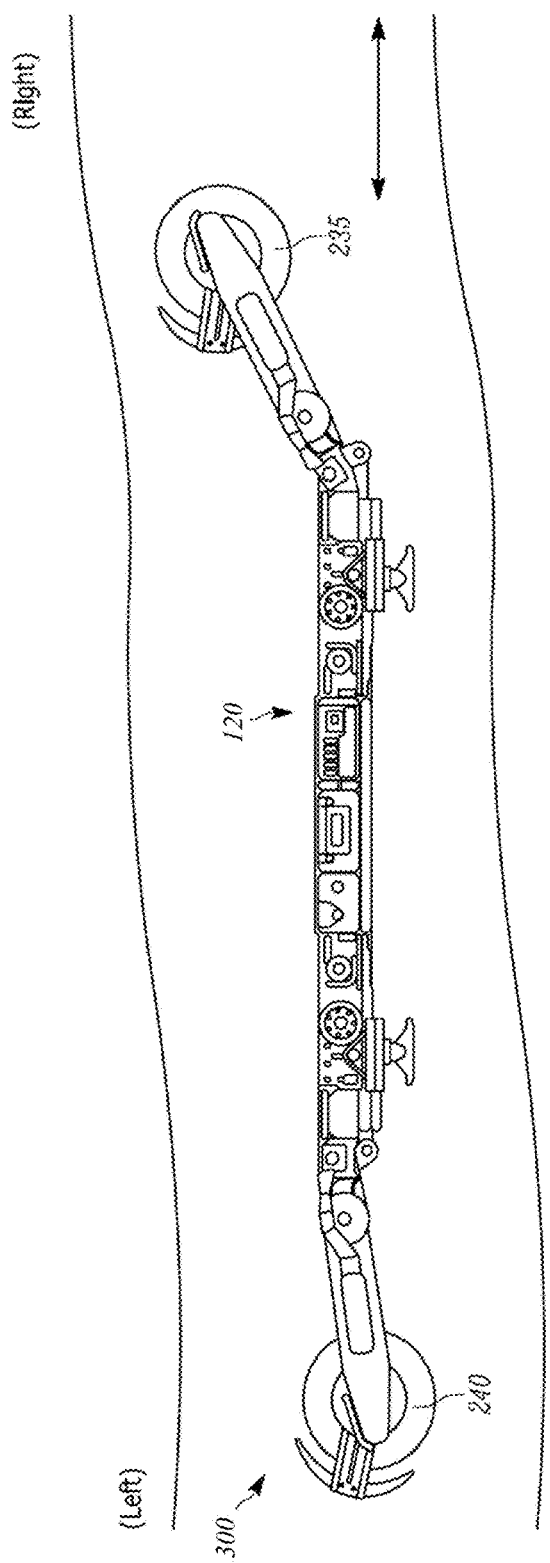
FIGS. 5A-B illustrate a longwall shearer as it passes through a coal seam.
Figure 5B:
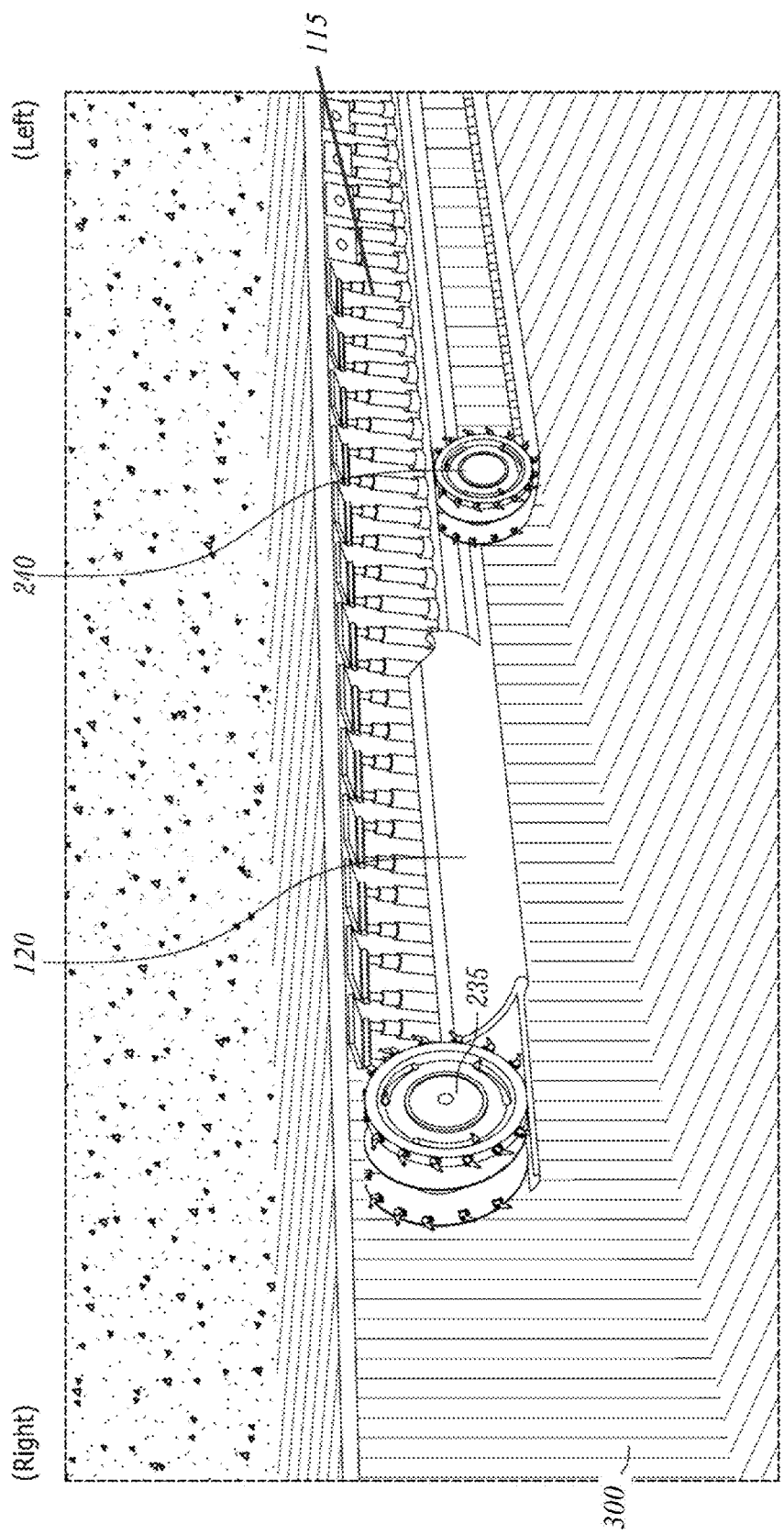

FIGS. 5A-B illustrate the shearer 120 as it passes through a mineral seam (e.g., a coal seam). As shown in FIG. 5A, the shearer 120 displaces laterally along the mineral face 300 in a bi-directional manner, though it is not necessary that the shearer 120 cut bi-directionally. For example, in some mining operations, the shearer 120 is propelled bi-directionally along the mineral face 300, but only shears mineral when traveling in one direction. Alternatively, the shearer 120 may be configured to extract one web of mineral during each of the forward pass and the return pass, thereby performing a bi-directional cutting operation. FIG. 5B illustrates the shearer 120 as it passes over the mineral face 300 from a face-end view. As shown in FIG. 5B, the right cutter drum 235 and the left cutter drum 240 are staggered to accommodate the full height of the mineral seam being mined. In particular, as the shearer 120 displaces horizontally along the AFC 125, the right cutter drum 235 is shown shearing mineral away from a top portion (e.g., the top half) of the mineral face 300, while the left cutter drum 240 is shown shearing mineral away from a bottom portion of the mineral face 300.

Depending on the height of the coal seam, the right cutter drum 235 and the left cutter drum 240 may not shear the same amount of mining material from the mineral face. Rather, one of the cutter drums 235, 240 may shear more or less mining material than the opposite cutter drum 235, 240. Additionally, the right cutter drum 235 and the left cutter drum 240 may shear different amounts of mineral based on, for example, the position of the shearer 120 along the mineral face 300. For example, the shearer 120 may shear more mineral while shearing a run-of-face section than when shearing a maingate section or a tailgate section. The maingate section of the mineral face 300 refers to a portion of the mineral face 300 that is closest to the maingate 135 of the AFC 125. In one example, the maingate section of the mineral face refers to the 20 roof supports 115 closest to the maingate 135 of the AFC 125, and the tailgate section of the mineral face refers to the 20 roof supports 115 closest to the tailgate 140 of the AFC 125. The run-of-face section refers to the section of the mineral face between the maingate section and the tailgate section. For example, if the longwall shearer system 105 includes a total of 100 roof supports indexed 1-100 starting from the maingate 135, the section of the mineral face corresponding to roof supports 1-20 refers to the maingate section, the section of the mineral face corresponding to roof supports 21-80 refers to the run-of-face section, and the section of the mineral face corresponding to roof supports 81-100 refers to the tailgate section. In some embodiments, the run-of-face section is further subdivided based on, for example, the index number corresponding to the roof support in that particular area of the mineral face 300. For example, the mineral face may include a maingate section, a first run-of-face section, a second run-of-face section, and a tailgate section.

Figure 6:
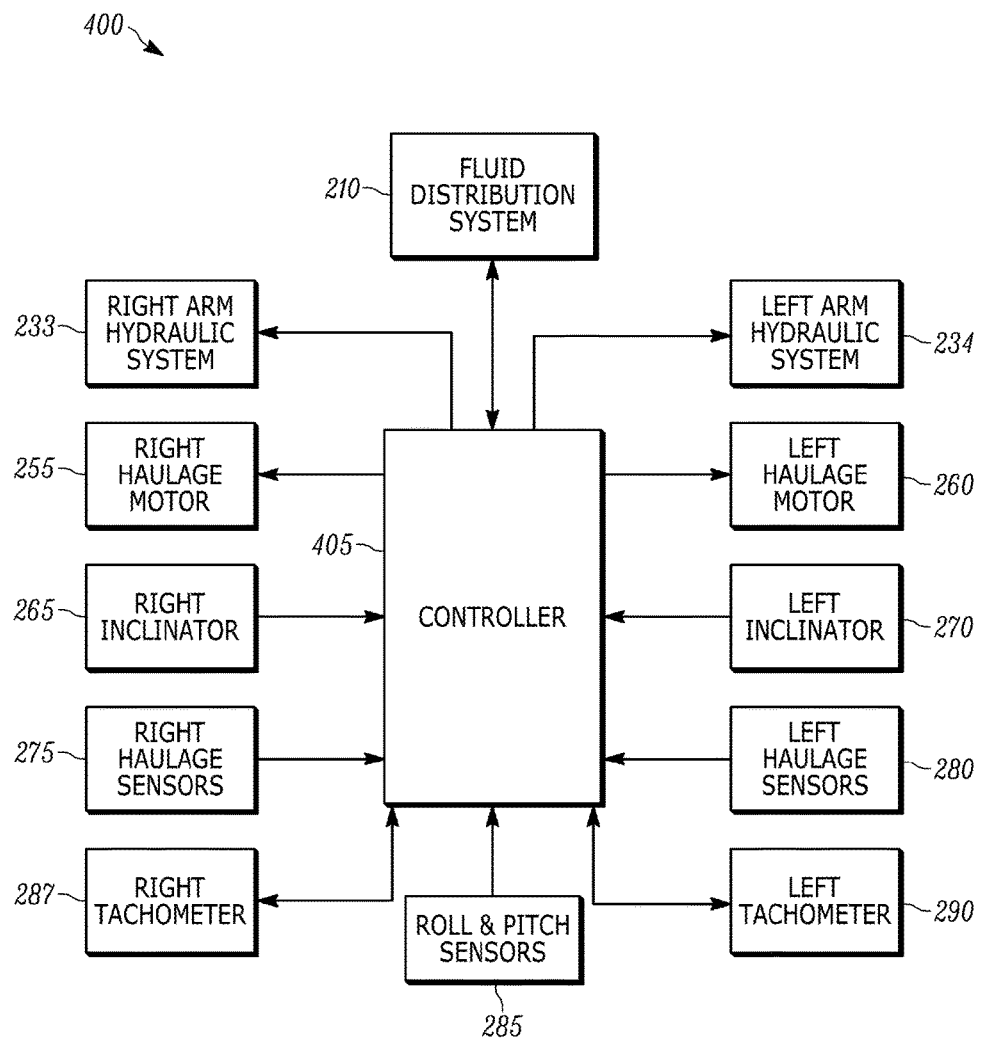
FIG. 6 is a schematic diagram of a shearer control system for the shearer of FIG. 2.
Figure 11:
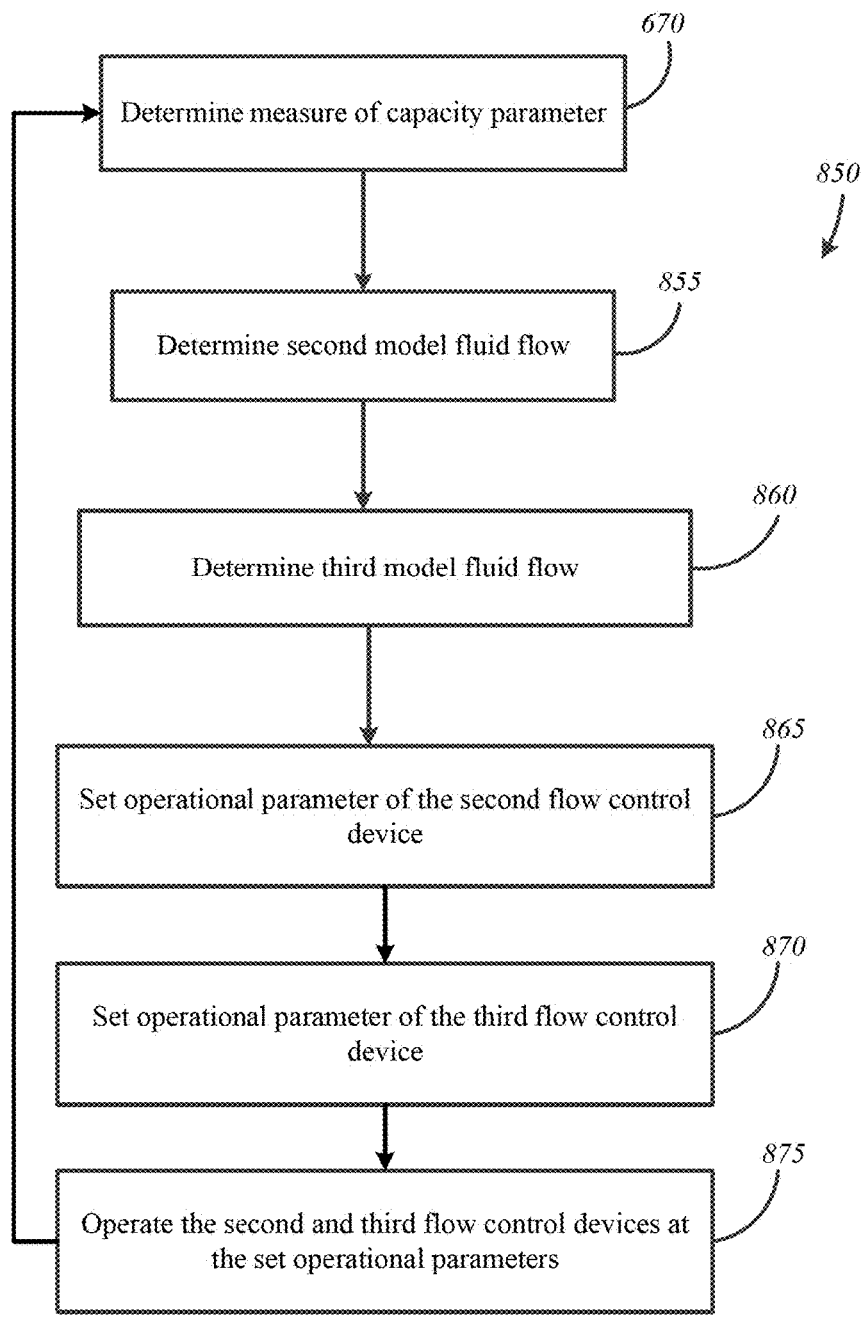
FIG. 11 is a flowchart illustrating a method of controlling a secondary flow control device of the fluid distribution system.

FIG. 6 is a schematic diagram of a shearer control system 400 to control operation of the shearer 120. The shearer control system 400 includes a main controller 405. The main controller 405 includes hardware (e.g., an electronic processor) and software (e.g., stored on a memory of the main controller 405) to execute locally-stored instructions/logic to control the shearer 120, based on instructions from an operator's radio and/or based on instructions communicated from a different processor of the monitoring system 110, or based on a combination thereof. The main controller 405 communicates with the various shearer sensors 265, 270, 275, 280, 285, 287, 290 to receive output signals indicative of position and/or movement of the shearer 120. The main controller 405 uses the received output signals to provide control signals to the right haulage motor 255, the left haulage motor 260, the right arm hydraulic subsystem 233, the left arm hydraulic subsystem 234, and the fluid distribution system 210. In the illustrated embodiment, the main controller 405 also sends sensor output signals from the sensors 265, 270, 275, 280, 285, 287, 290 to the fluid distribution system 210. The fluid distribution system 210 may provide general operational information to the main controller 405. For example, the main controller 405 determines which cutter drum 235, 240 shears the top portion of mineral from the mineral face, and the speed at which the cutter drums 235, 240 rotate. The main controller 405 also sends the corresponding signals to the right arm hydraulic subsystem 233, the left arm hydraulic subsystem 234, the right haulage motor 255, and the left haulage motor 260 to achieve the desired cutting heights and speeds. In some embodiments, the main controller 405 also controls the hydraulic systems to operate the roof supports 115 and the associated equipment (e.g., canopy, sprag, etc.). In some embodiments, the shearer control system 400 may be incorporated into an underground longwall control system 1005 (FIG. 11).

Figure 7:
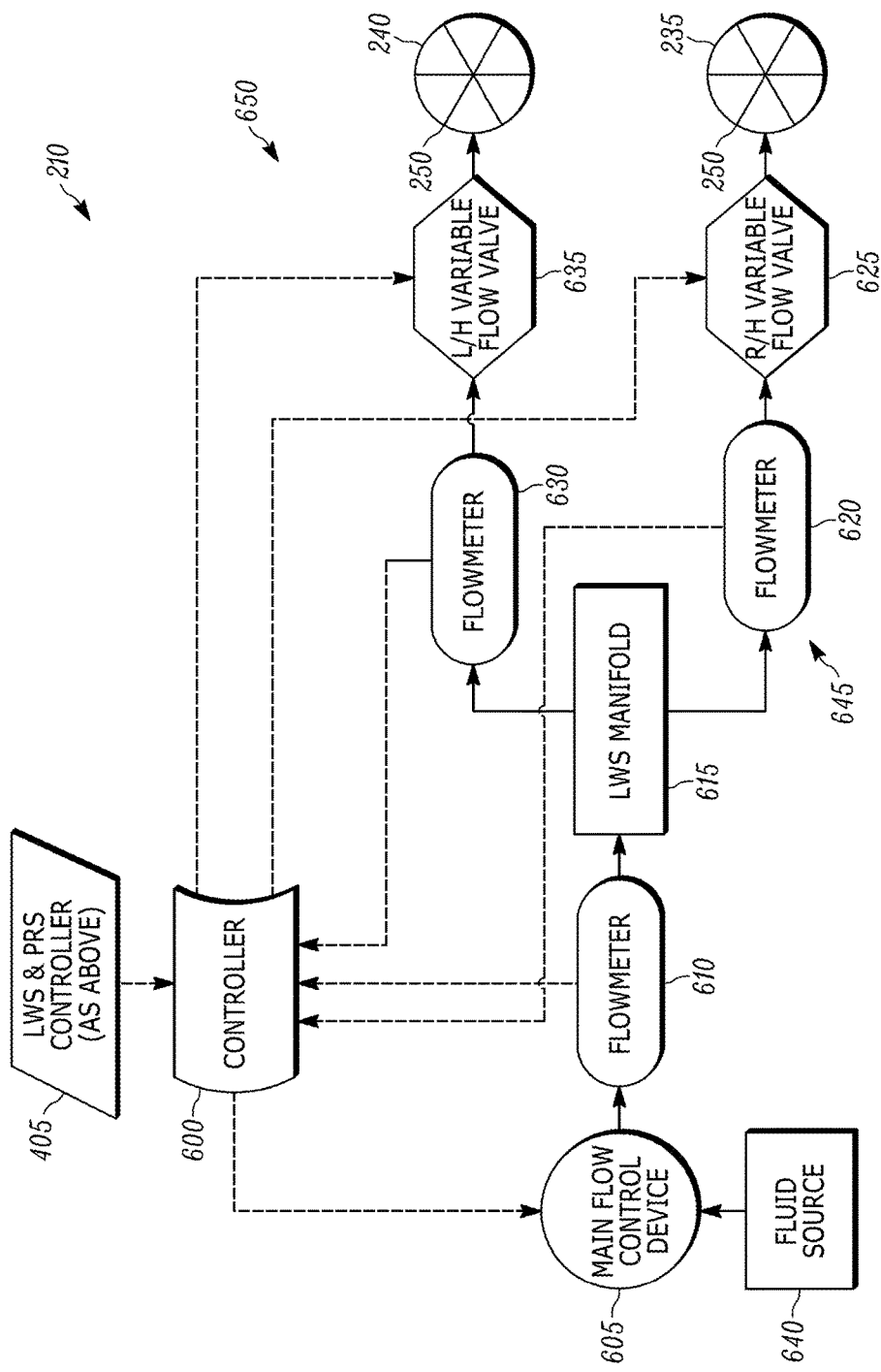
FIG. 7 is a schematic diagram of a fluid distribution system for the shearer of FIG. 2.

FIG. 7 is a schematic diagram of an exemplary fluid distribution system 210. The fluid distribution system 210 monitors and controls the amount of fluid (e.g., water) sprayed by the nozzles 250 on the cutter drums 235, 240 based on at least one capacity parameter received from, for example, the shearer control system 400. The fluid distribution system 210 includes an electronic processor 600, a main flow control device 605, a first flowmeter 610, a flow manifold 615, a set of secondary flow control devices (i.e., a second flow control device 625 and a third flow control device 635), a second flowmeter 620, and a third flowmeter 630. In the schematic of FIG. 7, solid lines represent a fluid communication line and dashed lines represent a data and/or control signal communication line. The main flow control device 605 is coupled to the electronic processor 600 to receive control signals from the electronic processor 600. The main flow control device 605 is in fluid communication with a fluid source 640, the first flowmeter 610 and the flow manifold 615. When the main flow control device 605 receives an activation signal from the electronic processor 600, the main flow control device 605 passes fluid from the fluid source 640 to the flow manifold 615 for distribution of fluid among the nozzles 250 of the first cutter drum 235 and the left cutter drum 240. The main flow control device 605 may be, for example, a variable speed pump and/or a variable flow valve. The control signals indicate to the main flow control device 605 a specific quantity or flow rate to pass from the fluid source 640 to the flow manifold 615.

When the main flow control device 605 includes a variable speed pump, the control signals may indicate an operating speed for the variable speed pump. When the main flow control device 605 includes a variable flow valve, the control signals may indicate an inlet opening size for the variable flow valve.

The flow manifold 615 is positioned between the main flow control device 605 and the second and third flow control devices 625. The flow manifold 615 receives the fluid from the main flow control device 605 when the main flow control device 605 is activated (e.g., open) by control signals from the electronic processor 600 The flow manifold 615 then distributes the fluid from the main flow control device 605 into a first path 645 leading to the nozzles 250 on the right cutter drum 235 and a second path 650 leading to the nozzles 250 on the left cutter drum 240. In particular, the flow manifold 615 passes the fluid from the main flow control device 605 to the second flow control device 625 and to the third flow control device 635.

The secondary flow control devices 625, 635 are positioned downstream from main flow control device 605 and the flow manifold 615. The second flow control device 625 is coupled to the electronic processor 600, the flow manifold 615, and the nozzles 250 on the right cutter drum 235. In particular, the second flow control device 625 is positioned between the flow manifold 615 and the nozzles 250 on the right cutter drum 235. The second flow control device 625 receives control signals from the electronic processor 600 indicating a specific quantity or flow rate to pass to the nozzles 250 on the right cutter drum 235. Based on the received control signals, the second flow control device 625 controls a flow rate from the flow manifold 615 to the nozzles 250 on the right cutter drum 235.

The third flow control device 635 is coupled to the electronic processor 600, the flow manifold 615 and the nozzles 250 on the left cutter drum 240. The third flow control device 635 is positioned between the flow manifold 615 and the nozzles 250 on the left cutter drum 240. The third flow control device 635 receives control signals from the electronic processor 600 indicating a specific flow rate to transfer to the nozzles 250 on the left cutter drum 240. Based on the received control signals, the third flow control device 635 controls a flow rate from the flow manifold 615 to the nozzles 250 on the left cutter drum 240.

In the illustrated embodiment, the second flow control device 625 and third flow control device 635 include a variable flow valve. In other embodiments, however, the second and third flow control devices 625, 635 may include other types of flow control devices such as, for example, a variable speed pump. Additionally, because the second flow control device 625 and the third flow control device 635 are both coupled to the flow manifold 615, by adjusting an operating parameter of, for example, the second flow control device 625, the flow rate to the third flow control device 635 is automatically adjusted. Similarly, by adjusting an operating parameter of the third flow control device 635, the flow rate to the second flow control device 625 is automatically adjusted.

The first flowmeter 610 is positioned between the main flow control device 605 and the flow manifold 615. The first flowmeter 610 measures a main flow rate of the fluid distribution system 210. The first flowmeter 610 is coupled to the electronic processor 600 to provide the electronic processor 600 an indication of the main flow rate of the fluid distribution system 210. The second flowmeter 620 is positioned between the flow manifold 615 and the second flow control device 625. The second flowmeter 620 measures a flow rate of the first path 645 of the fluid distribution system 210. That is, the second flowmeter 620 measures a flow rate directed to the nozzles 250 on the right cutter drum 235. The second flowmeter 620 is also coupled to the electronic processor 600 to provide an indication of the flow rate of the first path 645 of the fluid distribution system 210. The third flowmeter 630 is positioned between the flow manifold 615 and the third flow control device 635. The third flowmeter 630 measures a flow rate of the second path 650 of the fluid distribution system 210. That is, the third flowmeter 630 measures a flow rate directed to the nozzles 250 on the left cutter drum 240. The third flowmeter 630 is also coupled to the electronic processor 600 to provide the electronic processor an indication of the flow rate of the second path 650 of the fluid distribution system 210.

The electronic processor 600 is coupled to the main controller 405 of the shearer control system 400, the main flow control device 605, the first flowmeter 610, the second flowmeter 620, the third flowmeter 630, the second flow control device 625, and the third flow control device 635. In the illustrated embodiment, the electronic processor 600 receives capacity parameters from the shearer control system 400 (e.g., the main controller 405). The capacity parameters refer to parameters related to an amount of mineral (e.g., coal) that is mined (e.g., won). As more mineral is mined by the shearer 120, more noxious gases may be released. Therefore, as the amount of mined mineral increases, the fluid distribution system 210 also increases the flow rate of fluid through the nozzles 250 of the right cutter drum 235 and the left cutter drum 240. The capacity parameters indicate to the electronic processor 600 an approximate amount of the mineral that is being mined at a particular time. In the illustrated embodiment, the capacity parameters include, for example, a position of the shearer 120 along the mineral face 300 (e.g., a portion of the mineral face 300 where the shearer 120 is currently shearing mineral), a travel speed of the shearer 120 along the mineral face, the height of each of the cutter drums 235, 240, a travel direction of the shearer 120 along the mineral face 300, and a cutting depth of the shearer 120. The faster the shearer 120 moves along the mineral face 300, the more mineral that is won by the shearer 120. Similarly, as the cutting height of each of the cutter drums 235, 240 and/or cutting depth of the shearer 120 increases, the amount of won mineral also increases. The position of the shearer 120 also affects the amount of mineral won by the shearer 120. For example, when the shearer 120 changes direction at the maingate 135 or the tailgate 140, the shearer 120 does not extract as much mineral. However, as the shearer travels through the rest of the mineral face 300 (e.g., a run-of-face section), the shearer 120 extracts more mineral. Additionally, the travel direction of the shearer 120 also changes the amount of mineral won by the shearer 120. For example, when the shearer 120 shears mineral in a uni-directional manner (e.g., only shears mineral as it travels from the maingate 135 to the tailgate 140), the amount of won mineral in one travel direction is significantly greater than the won mineral in the opposite travel direction. In some embodiments, the capacity parameters may include other measurements of the shearer 120 related to an amount of mineral won. Based on the received capacity parameters, and on the flow rates received from the first, second, and third flowmeters 610, 620, 630, the electronic processor 600 generates control signals for each of the main flow control device 605, the second flow control device 625, and the third flow control device 635.

Figure 8:
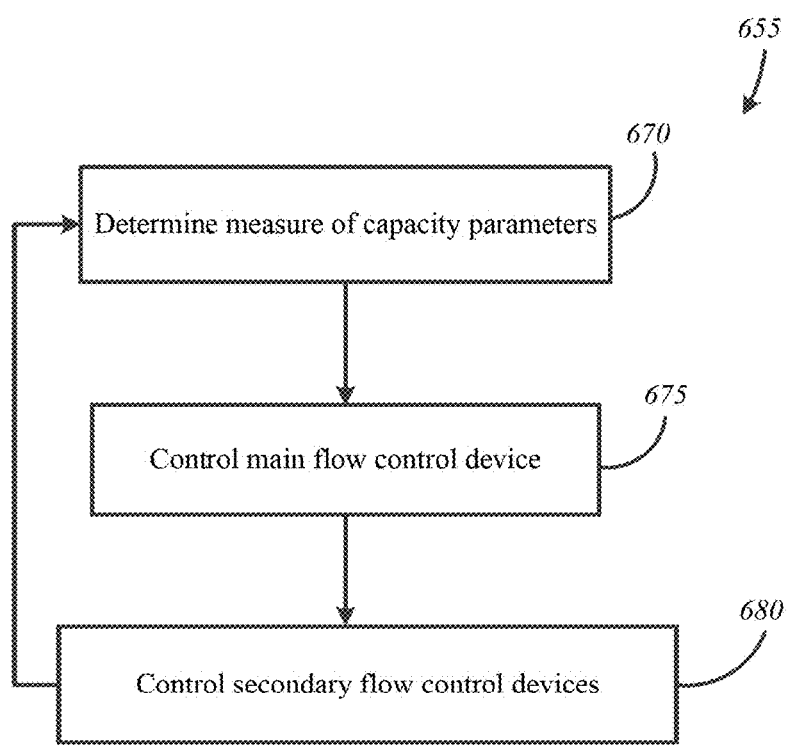
FIG. 8 is a flowchart illustrating a method of operating a fluid distribution system.

FIG. 8 is a flowchart illustrating a method 655 of operating the fluid distribution system 210. First, the shearer control system (i.e., the main controller 405) and/or the electronic processor 600 of the fluid distribution system 210 determines a measure of different capacity parameters (block 670). In some embodiments, the electronic processor 600 of the fluid distribution system 210 determines the measure of the capacity parameters by receiving the measure of the capacity parameters from the main controller 405 and/or from the shearer sensors 265, 270, 275, 280, 285, 287, 290. In other embodiments, the electronic processor 600 determines the measure of the capacity parameters by performing a calculation based on the output signals received from the shearer sensors 265, 270, 275, 280, 285, 287, 290. The electronic processor 600 then controls the main flow control device 605 based on a measure of a first capacity parameter (block 675). The electronic processor 600 also controls a set of secondary flow control devices 625, 635 based on the measure of a second capacity parameter (block 680). By controlling the main flow control device 605 and the secondary flow control devices 625, 635, the electronic processor 600 controls the amount of fluid sprayed by the nozzles 250 on both the right cutter drum 235 and the left cutter drum 240.

Figure 9:
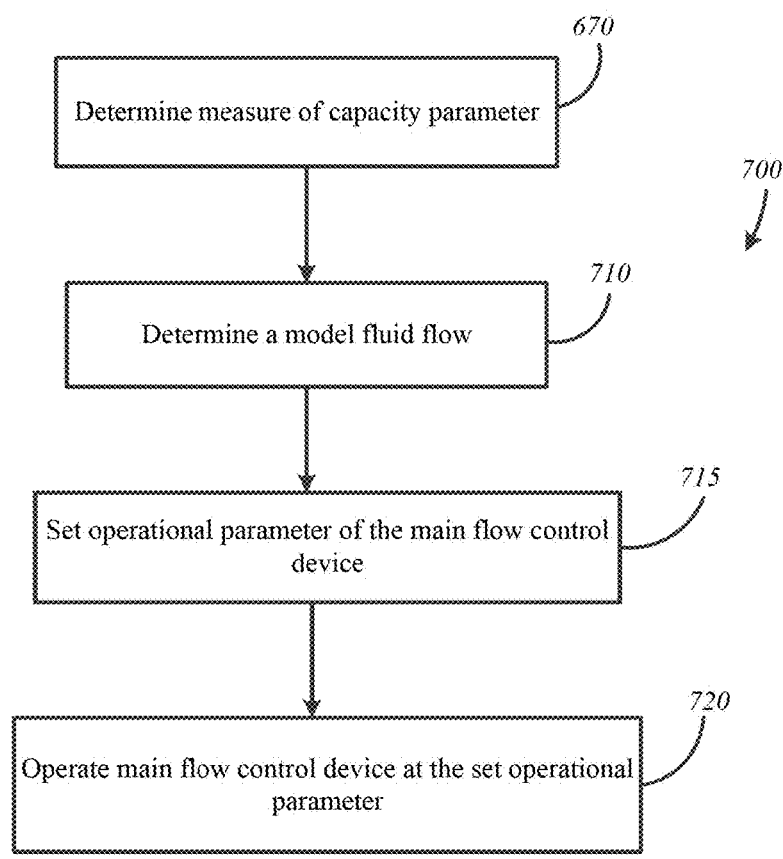
FIG. 9 is a flowchart illustrating a method of controlling a main flow control device of the fluid distribution system.

FIG. 9 is a flowchart illustrating a method 700 of controlling the main flow control device 605. In particular, method 700 may be used to implement block 675 of FIG. 8. First, as described with respect to block 670 of FIG. 8, the electronic processor 600 determines a measure of the capacity parameters. In the illustrated embodiment, the electronic processor 600 determines the speed of the shearer 120 along the mineral face 300 and a position of the shearer 120 along the mineral face 300. Then, based on the speed of the shearer 120, the electronic processor 600 determines a model fluid flow (block 710). The model fluid flow indicates a desired flow for the main flow control device 605 such that sufficient fluid is provided to disperse noxious gases while reducing fluid waste. The electronic processor 600 proceeds to set an operational parameter (e.g., a speed for a variable speed pump or an aperture size for a variable flow valve) of the main flow control device 605 based on the model fluid flow (block 715). In one example, the electronic processor 600 sets the operational parameter by first calculating a change in the operational parameter based on a current fluid flow through the fluid distribution system 210 as measured by the first flowmeter 610, the second flowmeter 620, and/or the third flowmeter 630. The electronic processor 600 then operates the main flow control device 605 at the set operational parameter (block 720). The electronic processor 600 continues to monitor the capacity parameters to control the current fluid flow of the fluid distribution system 210 until the fluid distribution system 210 is disabled when, for example, the shearer 120 is not in operation. Therefore, the fluid distribution system 210 adjusts an amount of fluid (e.g., water) provided to the nozzles 250 of the right and left cutter drums 235, 240 based on the measured capacity parameter(s).

Figure 10:
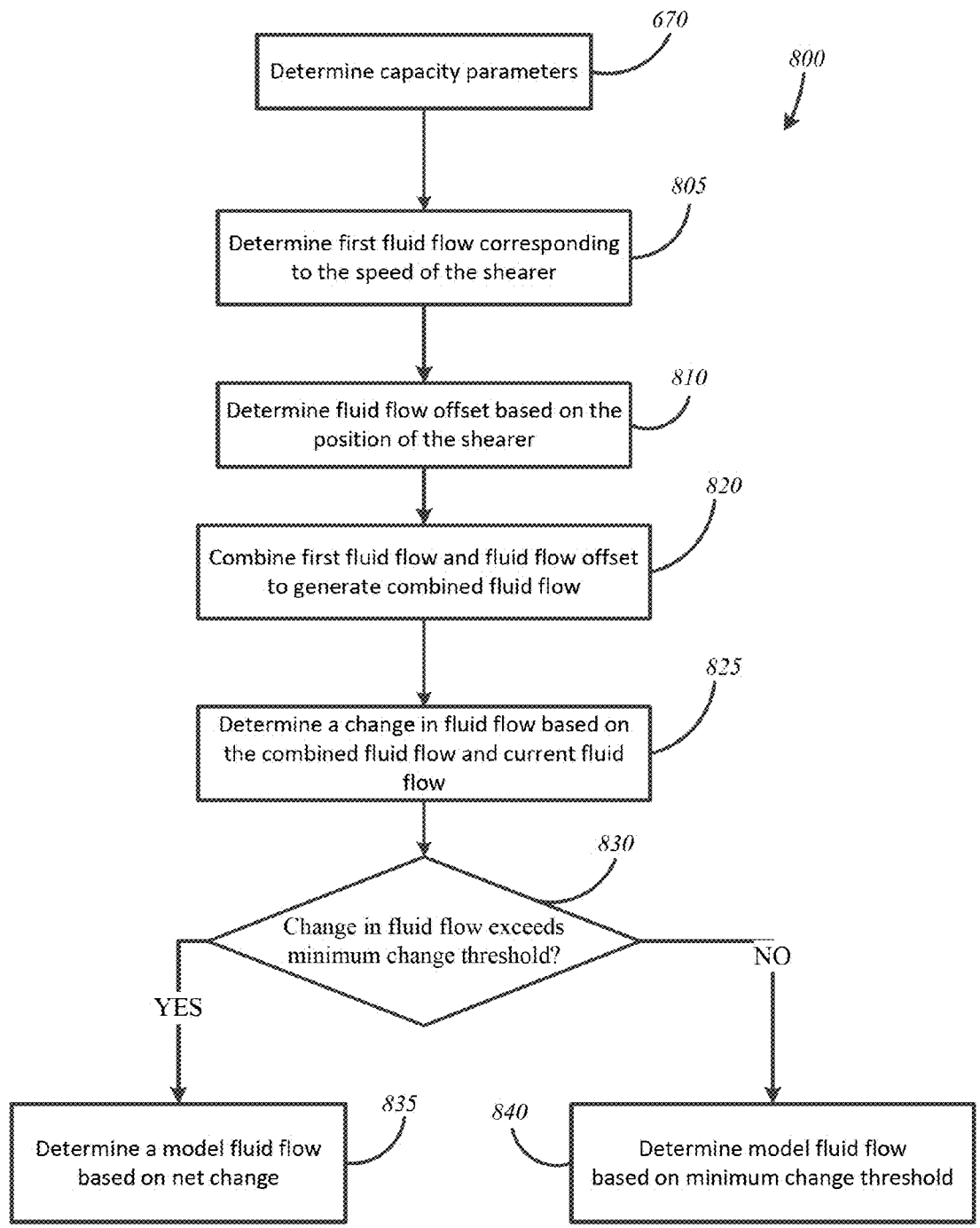
FIG. 10 is a flowchart illustrating a method of determining a model fluid flow for a main flow control device.

FIG. 10 is a flowchart illustrating an exemplary method 800 of determining a model fluid flow for the main flow control device 605. In particular, method 800 may be used to implement block 710 of FIG. 9. As discussed above, in the illustrated embodiment, the electronic processor 600 determines a measure of a speed of the shearer 120 along the mineral face 300, and a measure of the position of the shearer 120 along the mineral face 300 (block 670 of FIG. 8). The electronic processor 600 then determines a first fluid flow (or flow rate) corresponding to the received speed of the shearer 120 (block 805), and determines a fluid flow (or flow rate) offset corresponding to the received position of the shearer 120 along the mineral face 300 (block 810). The electronic processor 600 then combines (e.g., adds) the first fluid flow with the fluid flow offset to generate a combined fluid flow (block 820). The combined fluid flow is therefore based on both the speed of the shearer 120 and the position of the shearer 120 along the mineral face 300. In one example, the model fluid flow changes more significantly due to a change in the speed of the shearer 120 than due to a change in the position of the shearer 120. In other examples, however, changes in the speed of the shearer 120 have the same or a lesser impact than changes in the position of the shearer 120 along the mineral face.

In the illustrated embodiment, in block 805, the electronic processor 600 accesses a first look-up table storing a plurality of shearer speeds associated with corresponding fluid flows. The electronic processor 600 also accesses, in block 810, a second look-up table storing a plurality of shearer positions along the mineral face 300 associated with corresponding fluid flow offsets. In the illustrated embodiment, the position of the shearer 120 along the mineral face 300 may be one of a maingate section, a tailgate section, and a run-of-face section. In the illustrated embodiment, the first fluid flow based on the speed of the shearer 120 and the fluid flow offset based on the position of the shearer 120 along the mineral face 300 are limited by a minimum flow. The minimum flow corresponds to a minimum fluid flow delivered by the fluid distribution system 210 to the nozzles 250 on the right cutter drum 235 and to the nozzles 250 on the left cutter drum 240. Therefore, the first look-up table stores a lowest fluid flow corresponding to the minimum flow, or in some embodiments, corresponding to a fluid flow that is higher than the minimum flow. The lowest fluid flow offset stored in the second look-up table corresponds to a fluid flow offset that, when combined with the lowest fluid flow stored in the first look-up table, generates a fluid flow that is greater than or equal to the minimum flow.

The electronic processor 600 proceeds to determine a change in fluid flow based on the combination of the first fluid flow and the fluid flow offset and the current fluid flow of the fluid distribution system 210 (block 825). The electronic processor 600 then determines whether the change in fluid flow is above a predetermined minimum change threshold (block 830). The predetermined minimum change threshold refers to a minimum step change executable by the main flow control device 605. In the illustrated embodiment, the predetermined minimum change threshold corresponds to approximately between one and five liters per minute. In other embodiments, the predetermined minimum change threshold may be higher or lower based on, for example, specifications for the main flow control device 605.

When the change in fluid flow determined by the electronic processor 600 exceeds the predetermined minimum change threshold, the electronic processor 600 determines a model fluid flow for the main flow control device 605 based on the change in fluid flow (block 835). On the other hand, when the change in fluid flow does not exceed (e.g., is equal to or less than) the predetermined minimum change threshold, the electronic processor 600 determines the model fluid flow based on the predetermined minimum change threshold (block 840). The electronic processor 600 continues to monitor the capacity parameters and the current flow rate of the fluid distribution system 210 to update the flow rate through the nozzles 250.

FIG. 11 is a flowchart illustrating a method 850 of controlling the secondary flow control devices 625, 635. In particular, method 850 may be used to implement block 680 of FIG. 8. First, as described with respect to block 670 of FIG. 8, the electronic processor 600 determines a measure of the capacity parameters. The capacity parameters determined when controlling the secondary flow control devices 625, 635 are different than the capacity parameters used to control the main flow control device 605. While the electronic processor 600 controls the main flow control device 605 based on a shearer speed and/or a position of the shearer 120 along the mineral face 300 (e.g., a first capacity parameter), the electronic processor 600 controls secondary flow control devices 625,635 based on a cutting height of the right cutter drum 235, a cutting height of a left cutter drum 240, a cutting depth of the shearer 120, and a travel direction of the shearer 120 (e.g., a second capacity parameter). Therefore, while control of the main flow control device 605 enables broad adjustments to the fluid sprayed by the nozzles 250, by independently controlling the second and third flow control devices 625, 635 based on different capacity parameters, the electronic processor 600 more finely adjusts the fluid sprayed by the nozzles 250 on each of the right cutter drum 235, and the left cutter drum 240. As discussed with respect to FIG. 8, these capacity parameters may be received from, for example, the shearer control system 400.

Using the cutting height of the right cutter drum 235 and the left cutter drum 240, the cutting depth of the shearer 120, and the travel direction of the shearer 120, the electronic processor 600 customizes the flow to each of the first path 645 and the second path 650 of the fluid distribution system 210. In other words, based on the travel direction, the cutting heights, and the cutting depth of the shearer 120, the electronic processor 600 determines a second model fluid flow for the first path 645 (block 855) and determines a third model fluid flow for the second path 650 (block 860). As described with respect to FIG. 9, the model fluid flow indicates a desired flow for the second and third flow control devices 625, 635 such that sufficient fluid is sprayed to disperse noxious gases while also reducing fluid waste. The electronic processor 600 proceeds to set an operational parameter (e.g., an aperture size for the variable control valve) of the second flow control device 625 based on the second model fluid flow (block 865). In one example, the electronic processor 600 determines a change in the operational parameter for the second flow control device 625 based the model fluid flow for the first path 645 and on a current fluid flow of the first path 645 as measured by the second flowmeter 620. The electronic processor 600 also sets an operational parameter (e.g., the aperture size for the variable control valve) of the third flow control device 635 based on the third model fluid flow (block 870). In one example, the electronic processor 600 sets the operational parameter by first determining a change in the operational parameter for the third flow control device 635 based on the model fluid flow for the second path 650 and on a current fluid flow of the second path 650 as measured by the third flowmeter 630. The electronic processor 600 then operates the second and third flow control device 625, 635 at the set operational parameters (block 875). The electronic processor 600 also continues to monitor the current flow rate of the fluid distribution system 210 and the capacity parameters to periodically adjust the second and third flow control devices as necessary until the fluid distribution system 210 is disabled (e.g., deactivated).

Figure 12:
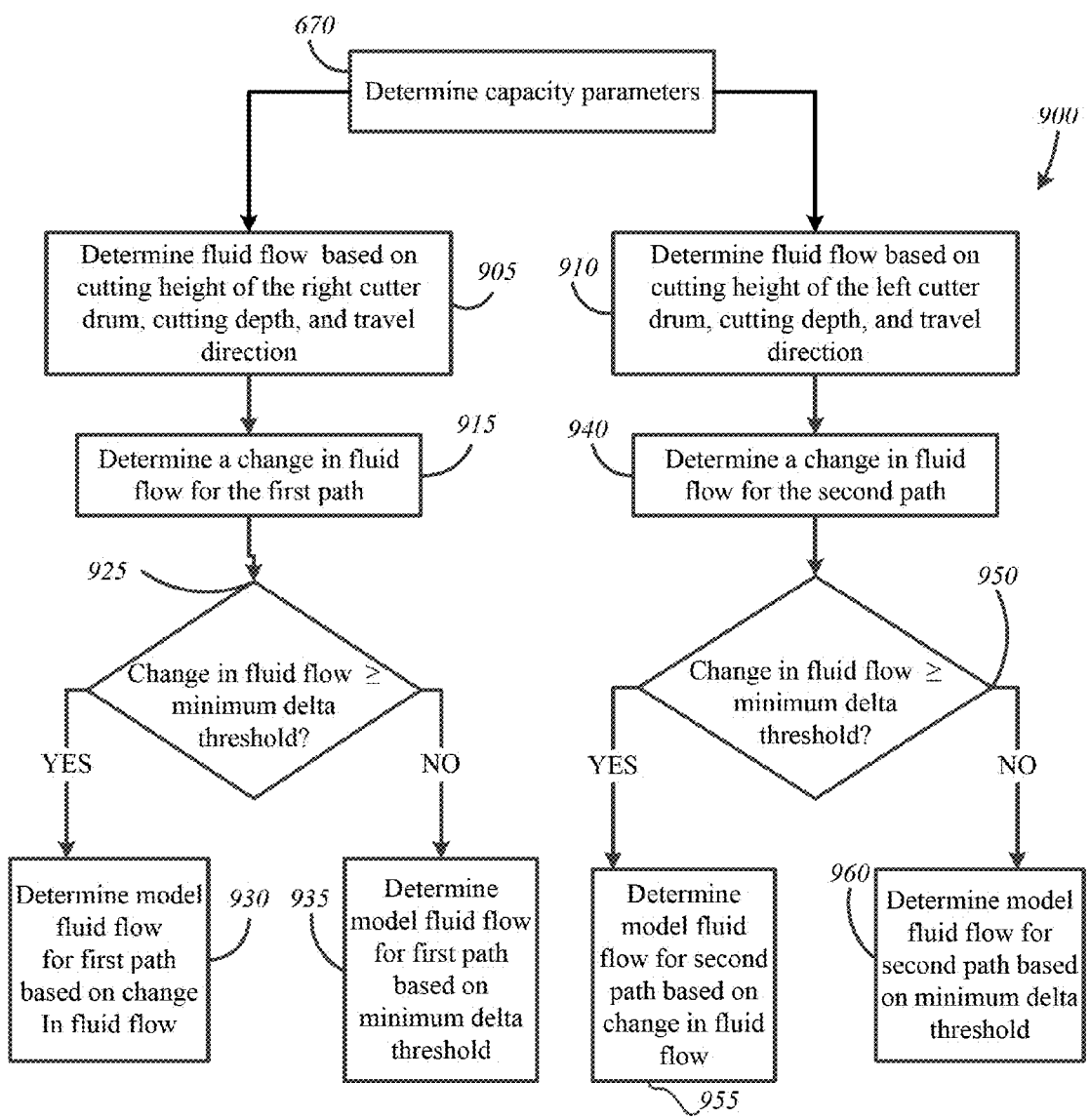
FIG. 12 is a flowchart illustrating a method of determining a model fluid flow for the secondary flow control device.

FIG. 12 is a flowchart illustrating a method 900 of determining a second model fluid flow for the nozzles 250 on the right cutter drum 235 (e.g., for the first path 645) and a third model fluid flow for the nozzles 250 on the left cutter drum 240 (e.g., for the second path 650). In other words, method 900 may be used to implement blocks 855 and 860 of FIG. 11. First, as described above and with respect to block 670 of FIG. 8, the electronic processor determines a measure of the capacity parameters. The electronic processor 600 determines a fluid flow (or flow rate) for the nozzles 250 on the right cutter drum 235 corresponding to the received cutting height of the right cutter drum 235, the cutting depth of the shearer 120, and the travel direction of the shearer 120 (block 905). The electronic processor 600 also determines a fluid flow (or flow rate) for the nozzles 250 on the left cutter drum 240 corresponding to the received cutting height of the left cutter drum 240, the cutting depth of the shearer 120, and the travel direction of the shearer 120 (block 910). In the one example, the electronic processor 600 accesses a look-up table storing a plurality of cutting heights associated with a travel direction and with corresponding fluid flows. From the look-up table, the electronic processor 600 can determine a fluid flow for the right cutter drum 235 and a fluid flow for the left cutter drum 240. Based on the determined fluid flows, the electronic processor 600 determines a change in fluid flow to the nozzles 250 on the right cutter drum 235 to achieve the determined fluid flow corresponding to the cutting height of the right cutter drum 235, the travel direction of the shearer 120, and the cutting depth of the shearer 120 (block 915).

The different capacity parameters affect the fluid flow differently. In one example, the electronic processor 600 increases the fluid flow to the first path 645 or the second path 650 when the travel direction is toward a maingate and when the cutting height of the shearer 120 increases. Analogously, the electronic processor 600 may decrease the fluid flow to the first or second path 645, 650 when the cutting height of the shearer decreases. However, when the shearer 120 travels toward the maingate (which would typically increase the flow rate), but decreases the cutting height and/or the cutting depth of the shearer 120, the fluid flow to the first or second path 645, 650 may decrease slightly or remain unchanged. The electronic processor 600 prioritizes the capacity parameters and changes the fluid flow to the first or second path 645, 650 based on the change of each capacity parameter and the relative priority associated with the parameter. In other words, a change in, for example, the cutting height of the shearer 120 causes a different change in the fluid flow to the first or second path 645, 650 than, for example, a change in shearer 120 direction would. In one example, changes in cutting height and/or cutting depth of the shearer 120 affect the fluid flow to the first or second path 645, 650 more significantly than changes in the travel direction of the shearer 120.

The electronic processor 600 then determines whether the change in fluid flow to the right cutter drum 235 exceeds a minimum delta threshold (block 925). The predetermined minimum delta threshold refers to a minimum step change executable by the second flow control device 625. In one example, the minimum delta threshold is the same as the minimum change threshold of FIG. 10. In other embodiments, the minimum delta threshold and the minimum change threshold correspond to different values due to, for example, differences between the main flow control device 605 and the secondary flow control devices 625, 635.

When the change in fluid flow for the first path 645 exceeds the minimum delta threshold, the electronic processor 600 determines a model fluid flow for the first path 645 using the change in fluid flow determined by the electronic processor 600 (block 930). However, when the change in fluid flow to the first path 645 does not exceed the minimum delta threshold, the electronic processor 600 determines a model fluid flow for the first path 645 using the minimum delta threshold instead of the determined change in fluid flow (block 935).

Based on the determined fluid flow for the second path 650, the electronic processor 600 determines a change in fluid flow to the second path 650 to achieve the determined fluid flow corresponding to the cutting height of the left cutter drum 240, the travel direction of the shearer 120, and the cutting depth of the shearer 120 (block 940). As discussed above with respect to the fluid flow for the first path 645, different capacity parameters may affect the fluid flow differently. The electronic processor 600 then determines whether the change in fluid flow of the second path 650 exceeds the minimum delta threshold (block 950). The minimum delta threshold used with respect to the first path 645 may be the same or different as the minimum delta threshold used with respect to the second path 650. When the change in fluid flow to the left cutter drum 240 exceeds the minimum delta threshold, the electronic processor 600 determines a model fluid flow for the second path 650 using the determined change in fluid flow (block 955). On the other hand, when the change in fluid flow for the second path 650 does not exceed the minimum delta threshold, the electronic processor 600 determines a model fluid flow for the second path 650 based on the minimum delta threshold instead of the determined change in fluid flow (block 960).

As discussed above with respect to FIGS. 8 through 12, the fluid distribution system 210 (e.g., the electronic processor 600) controls three different flow control devices 605, 625, 635 based on various capacity parameters. The capacity parameters are received from the shearer control system 400 (e.g., main controller 405) or calculated and/or determined by the electronic processor 600. By controlling the three flow control devices 605, 625, 635, the fluid distribution system 210 is configured to achieve a model fluid flow for the first path 645 (e.g., to the right cutter drum 235) and a different model fluid flow for the second path 650 (e.g., to the left cutter drum 240). Additionally, in this example, the capacity parameters considered for controlling the main flow control device 605 are different than the capacity parameters considered for controlling the second flow control device 625 and the third flow control device 635. In some implementations, the combination of capacity parameters used to control the main flow control device 605 and each of the secondary flow control device 625, 635 may be different than those described above with respect to FIGS. 8 through 12. Generally, the main flow control device 605 and the secondary flow control devices 625, 635 are controlled using different combination of capacity parameters (e.g., a first combination control the main flow control device 605, a second combination controls the second flow control device 625, and a third combination controls the third flow control device 635), although some overlap in each of the different combinations may occur.

Figure 13:
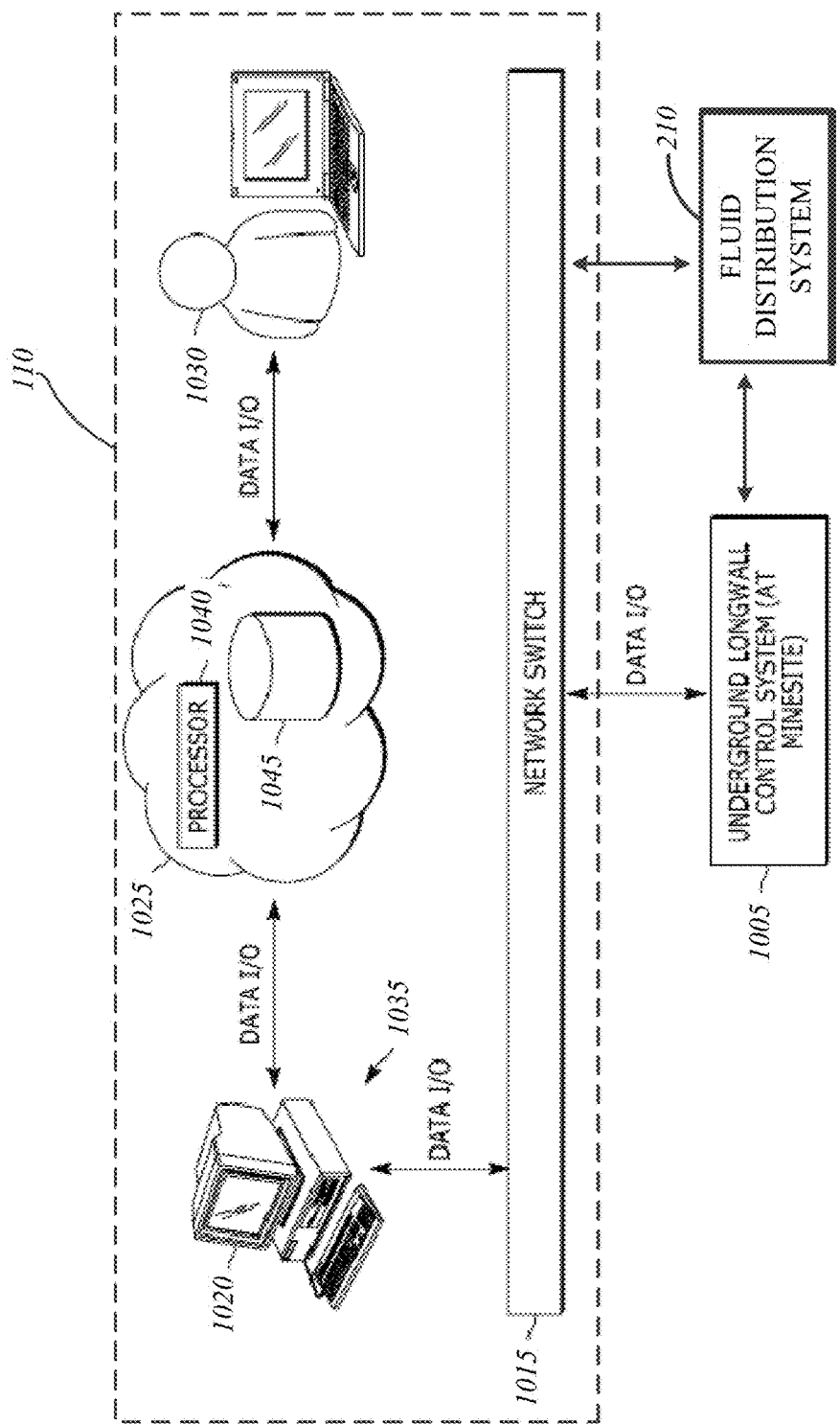
FIG. 13 is a schematic diagram of a longwall monitoring system according to one embodiment of the invention.

In the illustrated embodiment, the shearer control system 400 and the fluid distribution system communicate with the monitoring system 110 to provide access to operational data for the longwall shearer system 105 to users remote from the mining site. FIG. 13 is a schematic diagram of the longwall monitoring system 110 that may be used to control and/or monitor the fluid distribution system 210 as well as other aspects of the mining system 100. The longwall monitoring system 110 communicates with an underground longwall control system 1005 and the fluid distribution system 210. In the illustrated embodiment, the shearer control system 400 is incorporated into the underground longwall control system 1005. In some embodiments, the fluid distribution system 210 may also be incorporated into the underground longwall control system 1005.

The longwall monitoring system 110 includes a network switch 1015, a surface computer 1020, a remote server 1025, and a remote terminal 1030. The underground longwall control system 1005 is located at the mining site, and includes various components and controls of the shearer 120. In some embodiments, the longwall control system 1005 also include various components and controls of the roof supports 115, the AFC 125, and the like. The longwall control system 1005 is in communication with the surface computer 1020 via the network switch 1015 and an Ethernet or similar network 1035, both of which may also be located at the mine site.

The fluid distribution system 210 also communicates with the underground longwall control system 1005 and with the surface computer 1020 via the network switch 1015. In the illustrated embodiment, the fluid distribution system 210 is independently coupled to the network switch 1015 and the underground longwall control system 1005. In other embodiments, however, the fluid distribution system 210 may be coupled to the underground longwall control system 1005, but not the network switch 1015. Regardless of whether the fluid distribution system 210 communicates directly or indirectly with the network switch 1015, the surface computer 1020, the remote server 1025, and/or the remote terminal 1030 may have access to information regarding the fluid distribution system 210 (e.g., capacity parameters and/or flow rates of the main flow control device 605, second flow control device 625, and/or third flow control device 635) and may be configured to change parameters and/or thresholds used by the fluid distribution system 210. In other embodiments, the fluid distribution system 210 may be integrated with (e.g., a part of) the underground longwall control system 1005.

The network switch 1015 transfers data from the longwall control system 1005 to the surface computer 1020. The surface computer 1020 is further in communication with a remote server 1025, which can include various computing devices and processors 1040 for processing data received from the surface computer 1020. The remote server 1025 may also include various databases 1045 for storing data received from the surface computer 1020. The remote server 1025 stores and processes the data received from the surface computer 1020. The remote server 1025 further provides access to the databases 1045 for the remote terminal 1030. In some embodiments, the remote server 1025 may also generate alerts regarding the operation of the longwall mining system based on the data received from the surface computer 1020.

Each of the components in the monitoring system 110 is communicatively coupled for bi-directional communication. The communication paths between any two components of monitoring system 110 may be wired (e.g., via Ethernet cables or otherwise), wireless (e.g., via Wi-Fi, cellular, Bluetooth protocols), or a combination thereof. In some embodiments, the shearer control system 400 and the fluid distribution system 210 may not be in communication with the monitoring system 110.

Various features and advantages of the invention are set forth in the following claims.

What is claimed is:
1. A longwall shearer system comprising
   a shearer configured to travel along a mineral face, the shearer including
      a shearer body,
      a cutter drum coupled to the shearer body, and
      a nozzle positioned on the cutter drum;

a first electronic controller including a first processor and a first memory configured to measure a capacity parameter of a longwall shearer operation, the capacity parameter corresponding to a position of the shearer along the mineral face and indicating an approximate amount of mineral that is being mined at a particular time;

a fluid delivery system including
a flow control device in fluid communication with the nozzle and with a fluid source, and
a second electronic controller including a second processor and a second memory and coupled to the flow control device, the electronic controller configured to
receive the measure of the capacity parameter,
determine a model fluid flow based on the measure of the capacity parameter, and
set an operational parameter of the flow control device based on the model fluid flow, and
operate the flow control device at the set operational parameter.

2. The longwall shearer system of claim 1, the fluid delivery system further includes
a second flow control device coupled between the first flow control device and the nozzle,
wherein the second electronic controller is also coupled to the second flow control device, and wherein the second electronic controller is further configured to
receive a measure of a second capacity parameter, the second capacity parameter being different than the first capacity parameter,
determine a second model fluid flow based on the measure of the second capacity parameter,
change a second operational parameter of the second flow control device based on the second model fluid flow, and
operate the second flow control device at the changed parameter.

3. The longwall shearer system of claim 2, wherein the second capacity parameter is at least one selected from a group consisting of a travel direction of the shearer, a cutting height of a cutter drum of the shearer, and a cutting depth of the shearer.

4. The longwall shearer system of claim 1, wherein the position of the shearer along the mineral face includes at least one selected from a group consisting of a tailgate section, a maingate section, and a run-of-face section.

5. The longwall shearer system of claim 1, wherein the cutter drum is a first cutter drum, and wherein the shearer includes a second cutter drum, and a second nozzle positioned on the second cutter drum, and wherein the fluid delivery system further includes
a second flow control device coupled to the nozzle,
a third flow control device coupled to the second nozzle,
a manifold configured to couple the first flow control device to the second flow control device and the third flow control device,
wherein the second electronic controller is configured to
determine a measure of a second capacity parameter, the second capacity parameter being associated with the first cutter drum,
determine a measure of a third capacity parameter, the third capacity parameter being associated with the second cutter drum,
determine a second model fluid flow based on the second capacity parameter,
determine a third model fluid flow based on the third capacity parameter, the third model fluid flow being different than the second model fluid flow,
change a first operational parameter of the second fluid control device according to the second fluid flow model,
change a second operational parameter of the third fluid control device according to the third fluid flow model,
operate the second fluid control device and the third fluid control device at the changed parameters.

6. The longwall shearer system of claim 5, wherein the second capacity parameter includes a cutting height of the first cutter drum, and wherein the second electronic controller increases the second model fluid flow when a travel direction of the shearer is toward a maingate and when the cutting height of the shearer increases.

7. The longwall shearer system of claim 1, wherein the first cutter drum includes a plurality of mining bits arranged circumferentially on the first cutter drum, and a plurality of nozzles arranged circumferentially on the first cutter drum such that each nozzle corresponds to a mining bit of the plurality of cutting bits.

8. A method of controlling a fluid delivery system for a longwall shearer system, the method comprising:
determining, a measure of a capacity parameter, the capacity parameter corresponding to a position of a shearer along a mineral face and indicating an approximate amount of mineral that is being mined at a particular time;
determining, with an electronic processor, a model fluid flow based on the measure of the capacity parameter;
setting, with the electronic processor, a parameter of a flow control device based on the model fluid flow, the flow control device being in fluid communication with a nozzle positioned on a cutter drum of the shearer, and with a fluid source; and
operating, via the electronic processor, the flow control device at the set parameter to spray fluid, via the nozzle.

9. The method of claim 8, further comprising
determining, with the electronic processor, a measure of a second capacity parameter, the second capacity parameter being different than the first capacity parameter;
determining a second model fluid flow based on the measure of the second capacity parameter;
changing a second operational parameter of a second flow control device coupled between the first flow control device and the nozzle based on the second model fluid flow; and
operating the second flow control device at the changed parameter.

10. The method of claim 8, further comprising
determining, with the electronic processor, a measure of a second capacity parameter, the second capacity parameter being associated with a first cutter drum of the shearer;
determining a measure of a third capacity parameter, the third capacity parameter being associated with a second cutter drum of the shearer;
determining a second model fluid flow based on the second capacity parameter;
determining a third model fluid flow based on the third capacity parameter, the third model fluid flow being different than the second model fluid flow;
changing a first operational parameter of a second fluid control device coupled to the first nozzle positioned on the first cutter drum of the shearer;

changing a second operational parameter of a third fluid control device coupled to a second nozzle positioned on the second cutter drum of the shearer; and operating the second fluid control device and the third fluid control device at the changed parameters.

11. The method of claim 10, wherein determining the second model fluid flow includes increasing the second model fluid flow when a travel direction of the shearer is toward a maingate and when a cutting height of the first cutter drum is increased.

12. A fluid delivery system for a longwall shearer, the fluid delivery system comprising:

a flow control device in fluid communication with a nozzle positioned on the shearer, and in fluid communication with a fluid source;

a second electronic controller including a second processor and a second memory and coupled to the flow control device, the second electronic controller configured to receive a measure of a capacity parameter, the capacity parameter corresponding to a position of a shearer along a mineral face and indicating an approximate amount of mineral that is being mined at a particular time, determine a model fluid flow based on the measure of the capacity parameter, set an operational parameter of the flow control device based on the model fluid flow, and operate the flow control device at the set operational parameter.

13. The fluid delivery system of claim 12, further comprising a second flow control device coupled between the first flow control device and the nozzle, wherein the second electronic controller is also coupled to the second flow control device, and wherein the second electronic controller is further configured to receive a measure of a second capacity parameter, the second capacity parameter being different than the first capacity parameter, determine a second model fluid flow based on the measure of the second capacity parameter, change a second operational parameter of the second flow control device based on the second model fluid flow, and operate the second flow control device at the changed parameter.

14. The fluid delivery system of claim 13, wherein the second capacity parameter is at least one selected from a group consisting of a travel direction of the shearer, a cutting height of a cutter drum of the shearer, and a cutting depth of the shearer.

15. The fluid delivery system of claim 12, wherein the position of the shearer along the mineral face includes at least one selected from a group consisting of a tailgate section, a maingate section, and a run-of-face section.

16. The fluid delivery system of claim 12, wherein the cutter drum is a first cutter drum, and wherein the fluid delivery system further includes a second flow control device coupled to the first nozzle, a third flow control device coupled to a second nozzle positioned on a second cutter drum of the shearer, a manifold coupling the first flow control device to the second flow control device and the third flow control device, wherein the second electronic controller is configured to determine a measure of a second capacity parameter, the second capacity parameter being associated with the first cutter drum, determine a measure of a third capacity parameter, the third capacity parameter being associated with the second cutter drum, determine a second model fluid flow based on the second capacity parameter, determine a third model fluid flow based on the third capacity parameter, the third model fluid flow being different than the second model fluid flow, change a first operational parameter of the second flow control device according to the second model fluid flow, change a second operational parameter of the third flow control device according to the third model fluid flow, and operate the second flow control device and the third flow control device at the changed parameters.

17. The fluid delivery system of claim 16, wherein the second electronic controller increases at least one selected from a group consisting of the second model fluid flow and the third model fluid flow when a travel direction is toward a maingate and when a cutting height of the shearer increases.

18. The fluid delivery system of claim 12, wherein the second electronic controller is configured to determine the model fluid flow by determining a first fluid flow based on the measure of the capacity parameter;

determine a second fluid flow based on a travel speed of the shearer along the mineral face;

determine a net change in fluid flow based on the first fluid flow and the second fluid flow;

determine the model fluid flow based on the net change in fluid flow.

19. The fluid delivery system of claim 18, wherein the second electronic controller is further configured to determine whether the net change in fluid exceeds a minimum change threshold, determine the model fluid flow based on the net change in fluid flow when the net change exceeds the minimum change threshold; and determine the model fluid flow based on the minimum change threshold when the net change is less than or equal to the minimum change threshold.

* * * * *